United States Patent
Raghu et al.

(10) Patent No.: US 11,558,725 B2
(45) Date of Patent: Jan. 17, 2023

(54) EVENT CLUSTERING FOR BLE-MESH DEVICES

(71) Applicant: Texas Instruments Incorporated, Dallas, TX (US)

(72) Inventors: Arvind Kandhalu Raghu, Plano, TX (US); Mehul Soman, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/450,551

(22) Filed: Mar. 6, 2017

(65) Prior Publication Data

US 2018/0035247 A1 Feb. 1, 2018

Related U.S. Application Data

(60) Provisional application No. 62/367,516, filed on Jul. 27, 2016.

(51) Int. Cl.
| | |
|---|---|
| *H04W 4/00* | (2018.01) |
| *H04W 4/80* | (2018.01) |
| *H04W 76/10* | (2018.01) |
| *H04W 88/06* | (2009.01) |
| *H04W 84/12* | (2009.01) |
| *H04W 84/18* | (2009.01) |

(52) U.S. Cl.
CPC ............ *H04W 4/80* (2018.02); *H04W 76/10* (2018.02); *H04W 84/12* (2013.01); *H04W 84/18* (2013.01); *H04W 88/06* (2013.01)

(58) Field of Classification Search
CPC ....... H04W 4/80; H04W 76/10; H04W 84/12; H04W 84/18
See application file for complete search history.

(56) References Cited

U.S. PATENT DOCUMENTS

| | | | | |
|---|---|---|---|---|
| 2004/0185857 | A1* | 9/2004 | Lee | H04B 1/707 455/445 |
| 2013/0045770 | A1* | 2/2013 | Aschan | H04W 52/0216 455/522 |

(Continued)

FOREIGN PATENT DOCUMENTS

| | | |
|---|---|---|
| CN | 1568579 A | 1/2005 |
| CN | 102884842 A | 1/2013 |

(Continued)

OTHER PUBLICATIONS

Chinese Search Report for 2017890045325.3 dated Dec. 31, 2020.

(Continued)

*Primary Examiner* — Luat Phung
(74) *Attorney, Agent, or Firm* — Mandy Barsilai Fernandez; Frank D. Cimino

(57) ABSTRACT

A method of BLE-Mesh communications includes providing a dual-mode BLE-Mesh device including dual-mode RF driver, dual-mode manager, a BLE stack for BLE operations, and a mesh stack for mesh operations in a BLE-mesh network having a BLE relay device and a functional end BLE device. The BLE-mesh device has a periodic set of time indexed data slots common throughout the BLE-mesh network which provides a BLE event timeline for BLE connection events. The dual-mode BLE device implements an event clustering algorithm that delays or advances mesh events with respect to a timing the BLE connection events for clustering together their respective occurrences into continuous BLE/Mesh events to reduce a duty cycle by reducing a number of transitions from active mode to sleep mode and from sleep mode to active mode. The BLE-Mesh device communicates in the BLE-mesh network using the continuous BLE/Mesh events with at least one mesh device.

20 Claims, 3 Drawing Sheets

(56) References Cited

U.S. PATENT DOCUMENTS

| | | | | |
|---|---|---|---|---|
| 2014/0329498 | A1* | 11/2014 | Cherian | H04W 12/06 |
| | | | | 455/411 |
| 2015/0245351 | A1* | 8/2015 | Banerjea | H04W 40/023 |
| | | | | 370/338 |
| 2016/0088424 | A1 | 3/2016 | Polo et al. | |
| 2016/0157050 | A1* | 6/2016 | He | H04W 8/005 |
| | | | | 455/41.2 |
| 2016/0353470 | A1* | 12/2016 | Liu | H04L 65/4076 |
| 2017/0117978 | A1* | 4/2017 | Ko | H04H 20/93 |
| 2017/0201854 | A1* | 7/2017 | Choi | H04W 72/0406 |
| 2017/0230784 | A1* | 8/2017 | Kwon | H04W 52/0229 |
| 2017/0347359 | A1* | 11/2017 | Yang | H04W 72/0473 |
| 2018/0049122 | A1* | 2/2018 | Di Marco | H04W 52/0216 |

FOREIGN PATENT DOCUMENTS

| | | |
|---|---|---|
| CN | 204423068 U | 6/2015 |
| CN | 105103660 A | 11/2015 |
| CN | 204810290 U | 11/2015 |
| CN | 105656534 A | 6/2016 |

OTHER PUBLICATIONS

Chinese Office Action for 201780045325.3 dated Dec. 31, 2020.
2nd Chinese Office Action for Application No. 201780045325.3 dated Aug. 3, 2021.

* cited by examiner

EVENT CLUSTERING FOR BLE-MESH DEVICES

CROSS REFERENCE TO RELATED APPLICATIONS

This application and the subject matter disclosed herein claims the benefit of Provisional Application Ser. No. 62/367,516 entitled "Software techniques for lowering power-consumption of BLE-Mesh edge devices operating legacy BLE connection" filed on Jul. 27, 2016, which is herein incorporated by reference in its entirety.

FIELD

Disclosed embodiments relate generally to wireless communications, more specifically to Bluetooth Low Energy (BLE) automation mesh network (BLE-Mesh) communications.

BACKGROUND

BLE-Mesh is a wireless personal area network (WPAN) technology that uses a flooding-based protocol that with retransmission extends the range of BLE devices by including the ability to send messages to and amongst groups of devices. The devices in the BLE-Mesh network can support both BLE and BLE-mesh, but not necessarily both. A rebroadcasting mesh network works by flooding all messages to all nodes in the network through broadcasts.

The nodes in the mesh network all share a set of indexed data slots. Each time a device receives a broadcast message from another device in the mesh, the device repeats the message (rebroadcasts it), enabling its neighboring devices to 'hear' the new message. The neighboring devices rebroadcast this message to their neighbors, and the process is repeated until all devices in the mesh have received the same message. Flooding thus enables wireless devices to talk to each other without being within a direct radio range, as devices between them help by relaying the messages.

In a typical WPAN there are edge device(s) which are battery powered, relay devices that are always on as they are always in the listening mode, and functional end device(s), such as lights. Most BLE devices are battery powered so that power efficiency is generally an important consideration.

Smartphones and other some 'legacy devices' such as tablets and laptops support BLE, but do not currently support mesh formatted messaging. To enable such legacy devices to communicate with mesh devices, BLE connectivity needs to be enabled for mesh devices, creating the need for dual-mode BLE devices that provide both Mesh operations and BLE operations. However, adding this BLE-connectivity to mesh devices will significantly raise their power consumption, being a particular problem for battery-powered devices.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize dual-mode BLE devices that provide both mesh operation and BLE operation, particularly those being battery powered, can benefit from a reduction in their power consumption. Disclosed embodiments include techniques to cluster BLE events in time with mesh events for dual-mode BLE devices which reduce the number of wakeups that results in reducing the number of transitions from active to sleep and sleep to active, thus lowering the device's power consumption.

Disclosed embodiments include methods of BLE-Mesh communications that include providing a dual-mode BLE-Mesh device including dual-mode RF driver, dual-mode manager, a BLE stack, and a mesh stack for mesh operations in a BLE-mesh network having a BLE relay device and a functional end BLE device. The dual-mode BLE-mesh device has a periodic set of time indexed data slots common throughout the BLE-mesh network which provides a BLE event timeline for BLE connection events. The dual-mode BLE device implements an event clustering algorithm that delays or advances mesh events with respect to a timing the BLE connection events for clustering together their respective occurrences into continuous BLE/Mesh events to reduce a duty cycle by reducing a number of transitions from active mode to sleep mode and from sleep mode to active mode. The dual-mode BLE-Mesh device communicates in the BLE-mesh network using the continuous BLE/Mesh events with at least one mesh device.

BRIEF DESCRIPTION OF THE DRAWINGS

Reference will now be made to the accompanying drawings, which are not necessarily drawn to scale, wherein.

DETAILED DESCRIPTION

Figure 1:
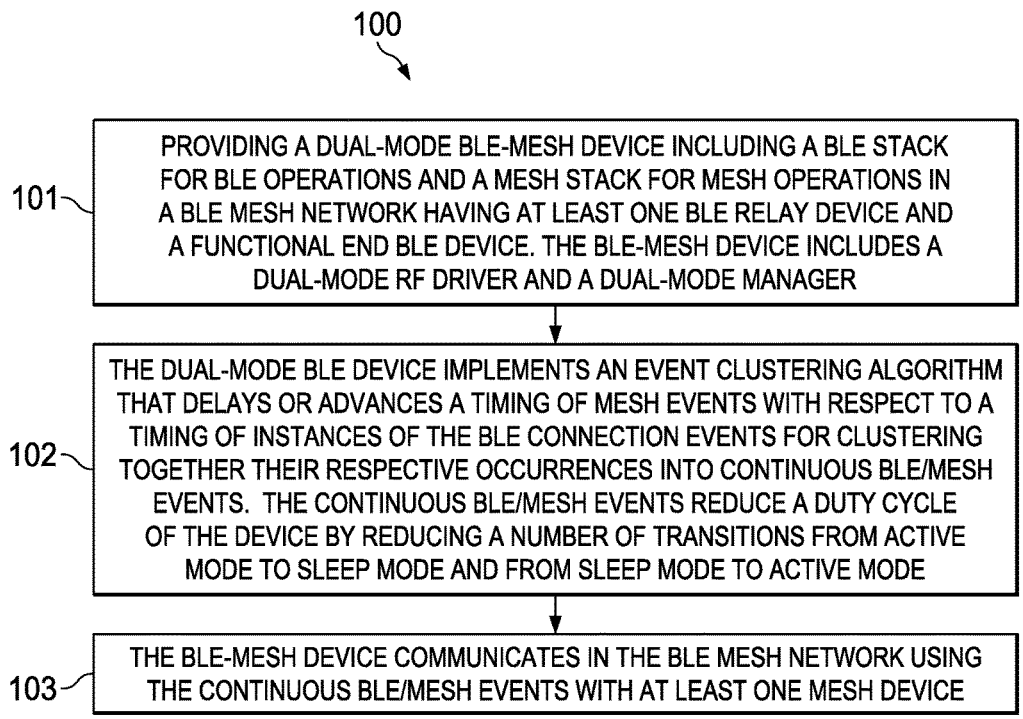
FIG. 1 is a flowchart for an example method of BLE-Mesh communications, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flowchart for an example method 100 of event clustering for BLE-Mesh communications, according to an example embodiment. BLE is used as the physical transport of the mesh network, referred herein as a BLE-mesh network, such as using the Bluetooth 4.1 specification. The BLE-mesh network environment includes a plurality of spaced apart dual-mode BLE-Mesh devices. A cluster of dual-mode BLE-enabled devices which are identifiable to one another may participate as routing nodes to provide range extension for any two participating BLE-mesh devices that would otherwise be out of the BLE transmission range from each other. The BLE-mesh network can be a secure network.

Step 101 comprises providing a dual-mode BLE-Mesh device including a BLE stack for BLE operations and a mesh stack for mesh operations in a BLE-mesh network having a least one BLE relay device and a functional end BLE device. The dual-mode BLE-Mesh device includes a dual-mode RF driver and a dual-mode manager. The dual-mode BLE-Mesh device has a periodic set of time indexed data slots that is common throughout the BLE-mesh network which provides a BLE event timeline for a plurality of BLE connection events. BLE connection events typically involve a periodic receive (Rx) and transmit (Tx) between a pair of dual-mode BLE-Mesh devices that occurs every connection interval time period. Other connection events can also occur defined in the BLE Special Interest Group (SIG) specification.

Step 102 comprises the dual-mode BLE device implementing an event clustering algorithm that delays or advances a timing of mesh events with respect to a timing of instances of the BLE connection events for clustering together their respective occurrences into continuous BLE/Mesh events. (See FIG. 2 and FIG. 3 described below for event clustering examples). The continuous BLE/Mesh events reduce a duty cycle of the device by reducing a number of transitions from active mode to sleep mode and from sleep mode to active mode. As known in the art duty cycle is the ratio of time in which the signal is active (in percentage). The formula is (duty cycle=(time signal is active/total period of signal)×100%). For example, if a BLE device sends data for 1 ins then sleeps for 999 ms, then the (duty cycle=(1/1000)*100)=0.1%.

Mesh events include FR LPN pinging (transmitting) and FR LPN receiving each involving mesh packets. Step 103 comprises the dual-mode BLE-Mesh device communicating in the BLE-mesh network using the continuous BLE/Mesh events with at least one mesh device.

Figure 2:
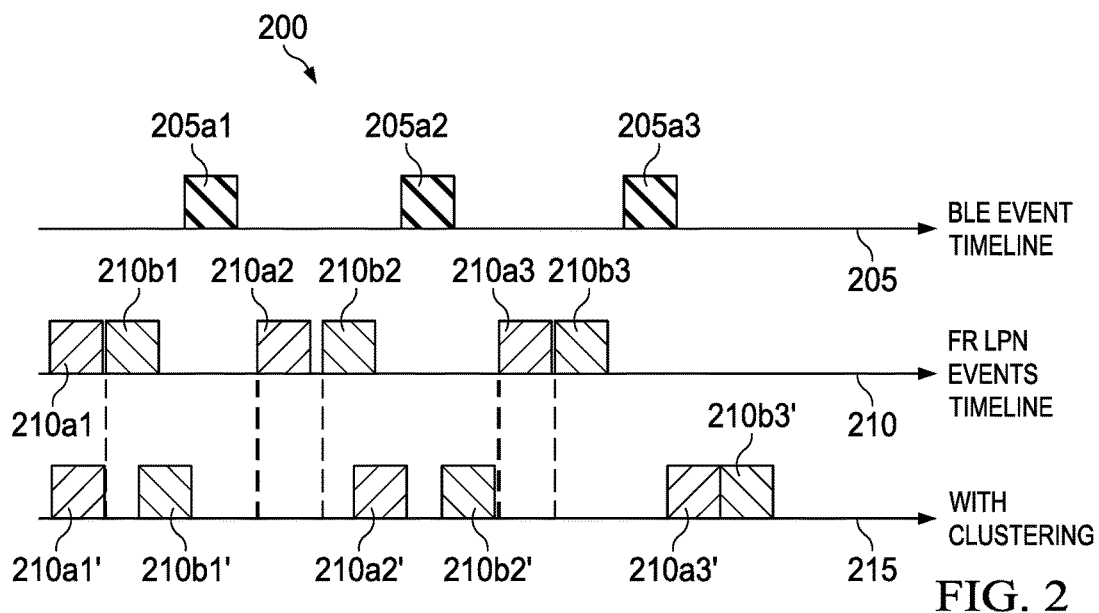
FIG. 2 shows an example timeline showing a BLE event timeline, friend (FR) low-power mesh edge Node (LPN) events timeline, and disclosed clustering of mesh events with BLE connection events to reduce the number of wakeups and sleeps.

FIG. 2 shows an example timeline 200 for a low-power FR edge node including a BLE event timeline 205 including periodic BLE events 205a1, 205a2 and 205a3, a FR LPN events timeline 210 including FR LPN receives 210a1, 210a2, and 210a3, and FR LPN pings 210b1, 210b2 and 210b3, and disclosed positions of the respective pings and receives after clustering shown as 'with clustering' 215 to provide continuous BLE/Mesh events that reduce the number of wakeups and sleeps. As per the spec, a "friendship" is established between a FR relay device and an LPN. An edge device sends a ping with a FRND bit set, TTL=0, wakes up after FR Receive Delay (FRD), and is in scan state for FR. Receive Window (FRW) duration. RF access for this ping and scan for FRW will be dedicated.

It can be seen in the leftmost clustering example ping 210b1 is time shifted now shown as 210b1' to cluster with the BLE event 205a1, in the center clustering example the receive 210a2 and pong 210b2 are both modified in time now shown as 210a2' and 210b2' to cluster before and after the BLE event 205a2 respectively, and in the rightmost clustering the receive 210a3 and ping 210b3 are both modified in time now shown as 210a3' and 210b3' to cluster after the BLE event 205a3.

Figure 3:
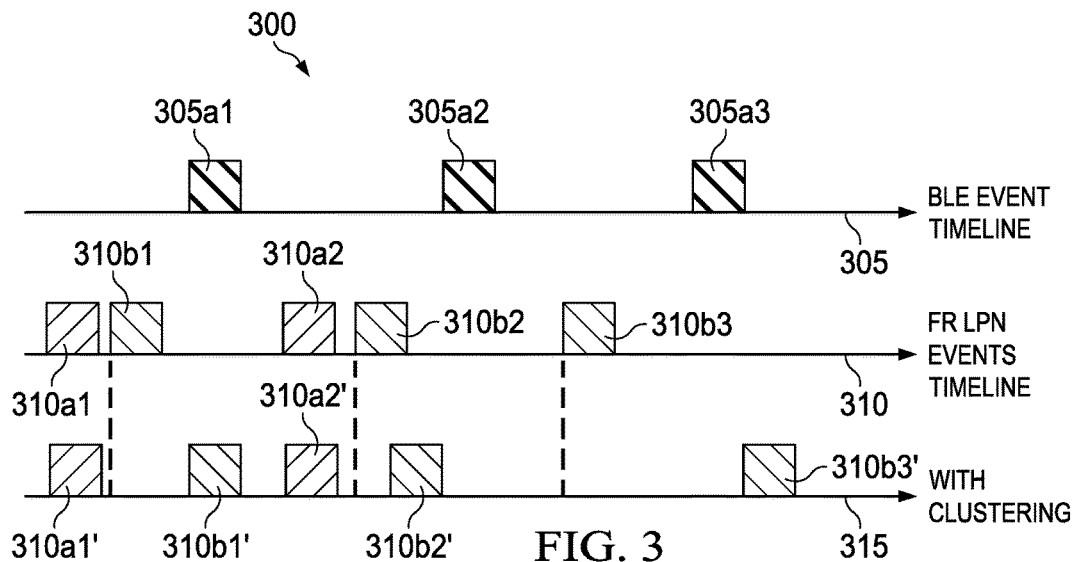
FIG. 3 shows an example timeline for a low power relay node including a BLE event timeline, relay events timeline, and disclosed clustering of mesh relay events with the BLE connection events shown to reduce the number of wakeups and sleeps.

FIG. 3 shows an example timeline 300 for a low power relay node including a BLE event timeline 305 including periodic BLE events 305a1, 305a2, and 305a3, a FR low-power mesh edge Node (LPN) events timeline 310 including Mesh receives 310a1, 310a2, and Mesh transmits 310b1, 310b2, and 310b3, and disclosed clustering shown as 'with clustering' 315. Disclosed clustering 315 has the Mesh transmits time shifted now shown a 310b1', 310b2', and 310b3' clustering with the BLE events 305a1, 305a2, and 305 a3 to reduce the number of wakeups and sleeps. Since this Example shows only Tx events postponed it is applicable to current mesh routing nodes as well. The Mesh Tx events should generally be postponed only up within a threshold duration (the time between BLE connection events) to keep the impact of the timing change low.

Figure 4A:
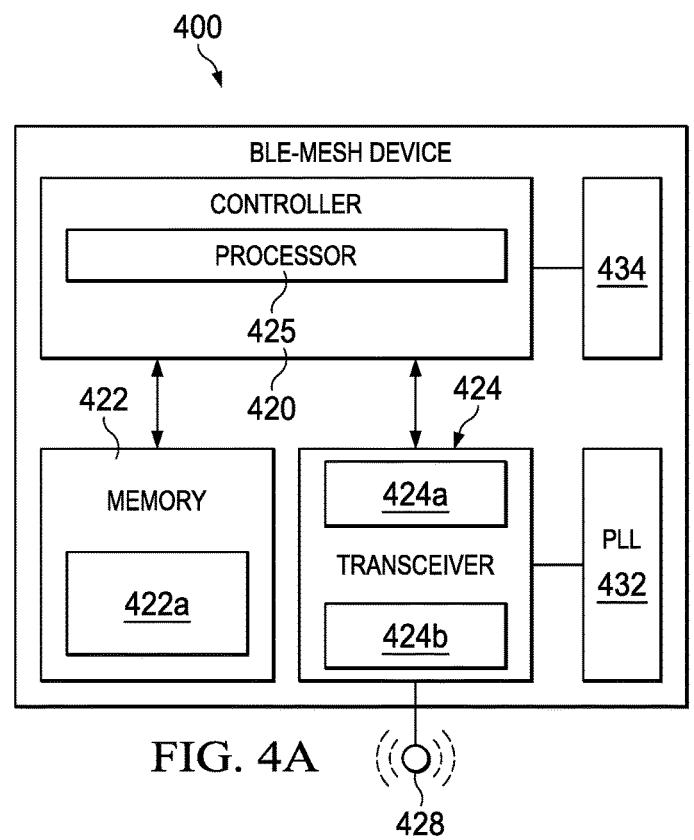
FIG. 4A is a block diagram schematic of an example disclosed dual-mode BLE-Mesh device that can implement disclosed event clustering for BLE-Mesh communications, according to an example embodiment.
Figure 4A:

FIG. 4A shows a system block diagram representation for an example dual-mode BLE-Mesh device 400 that generally conforms to the BLE communications standard. The dual-mode BLE-Mesh device 400 may be any device that can engage in BLE communications. Such devices may be, may include, or may be a part of, mobile phones such as smartphone, tablets, computers, personal digital assistants, and household items with communication capabilities such as door knobs, window blinds, and motion sensors. The dual-mode BLE-Mesh device 400 communicates in a BLE-mesh network along with as plurality of other BLE devices to a network (e.g., the Internet) that is coupled to a central authority database that is generally stored on a server.

The dual-mode BLE-Mesh device 400 comprises a controller 420 including a processor 425, a memory 422 including software 422a for a disclosed event clustering for BLE-Mesh communications algorithm, and a transceiver 424 including a dual-mode RF driver 424a that is coupled to an antenna 428. The controller 420 implements a BLE stack for BLE operations and a mesh stack for mesh operations. The transceiver 424 is also shown including hardware comprising digital logic 424b that can be used as an alternative to software 422a for implementing a disclosed event clustering for BLE-Mesh communications algorithm. As known in the art the transceiver 424 includes a transmitter and a receiver. The transmitter generally comprises a media access control (MAC) module, an encoder, a modulator, an Inverse Fast Fourier Transform (IFFT) unit, a digital to analog conversion (DAC)/filter module, and an RF/antenna module. The receiver generally comprises an RF/antenna unit, an analog to digital conversion (ADC)/filter unit, a FFT unit, a demodulator, a decoder, and a MAC module.

The memory 422 is more generally configured to store information including data, instructions, or both. The memory 422 may be any storage medium accessible by the controller 420, such as a read only memory (ROM), a random access memory (RAM), a register, cache memory, or magnetic media device such as internal hard disks and removable disks. A phase lock loop (PLL) 432 is also provided for purposes including mixing and frequency synthesis.

The dual-mode BLE-Mesh device 400 is also shown including hardware comprising digital logic 434 that can also be for implementing a disclosed event clustering for BLE-Mesh communications algorithm. However, as noted above the event clustering for BLE-Mesh communications algorithm may also be implemented by software.

The controller 420 is coupled to the memory 422 and to the transceiver 424. In some implementations, the transceiver 424 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform ADC, DAC, filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at the radio frequencies of the BLE-mesh network. The radio frequencies may be 2.4 GHz to 2.483-GHz frequency band for BLE communications, and a lower frequency such as about 1.0 to 1.5 GHz per the BLE standard (generally not sub-1 GHz for mesh communications), or other specifications depending on future radio access technology.

Figure 4B:
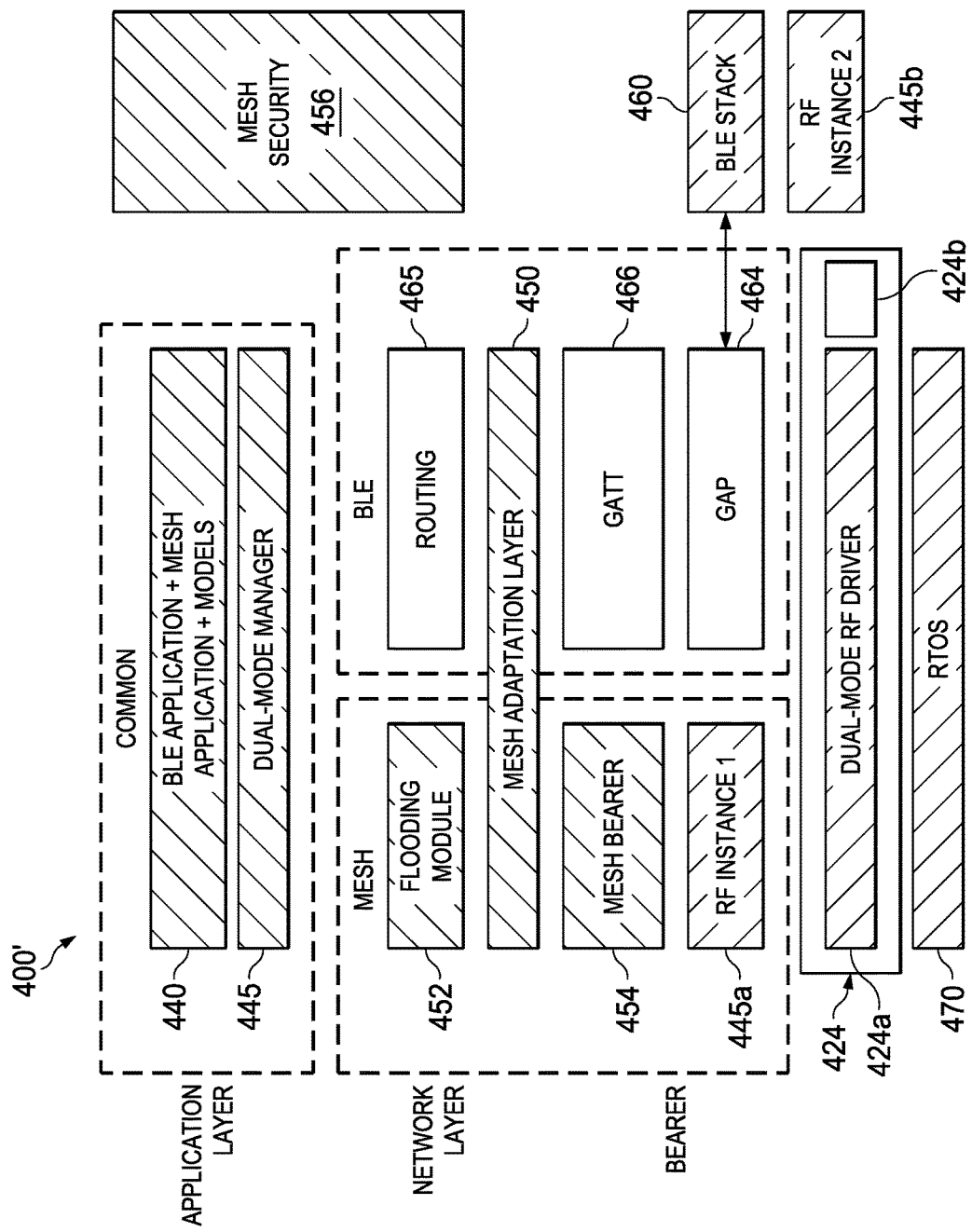
FIG. 4B is a functional layer depiction of the dual-mode BLE-Mesh device shown in FIG. 4A including a dual-mode manager.

FIG. 4B is a functional layer depiction of the dual-mode BLE-Mesh device 400 shown in FIG. 4A now shown as 400' that includes an application layer including BLE applications, mesh application, models 440, and a dual-mode manager 445. All blocks above the dual-mode RF driver 424a are generally software (SW) running on the processor 425 shown in FIG. 4A in memory 422 (typically stored in flash RAM or ROM). Dual-mode BLE-Mesh device 400' implements simultaneous operation of the BLE and Mesh software (SW) stacks using the dual-mode RF driver 424a. There is an RF instance 1 445a for Mesh operations and an RF instance 2 445b for BLE operations.

The dual-mode manager 445 handles RF access priorities based on the stack states, with generally three priority levels being dedicated, high, and normal. The Mesh adaptation layer 450 formats for BLE or Mesh accordingly and signals appropriate for the particular application. The dual-mode RF driver 424a includes driver Application Programming Interface (API) software and the radio itself in hardware. There is also a flooding module 452, Mesh bearer layer 454 and Mesh security 456 all for mesh communications.

Dual-mode BLE-Mesh device 400' also includes BLE stack 460, Generic Access Profile (GAP) 464 which controls connections and advertising in Bluetooth, and Generic Attribute Profile (GATT) 466 which uses ATT to describe how data is exchanged from two connected devices for BLE. Dual-mode BLE-Mesh device 400' also includes a BLE routing block 465. The BLE routing block 465 is different from the flooding-based mesh. If routing is present, then each node maintains neighbor tables and messages that are sent via deterministic paths to reach a specific destination. In a flooding-based mesh, messages are broadcast to all devices across the network over multiple hops.

Dual-mode BLE-Mesh device 400' is also shown having a real-time operating system (RTOS) 470. RTOS 470 scales from a low-footprint, real-time preemptive multi-tasking kernel to a complete RTOS with additional middleware components including a power manager, TCP/IP and USB stacks, an embedded file system and device drivers.

Benefits of disclosed event clustering include reducing the overall power consumption of nodes and the maintaining of interoperability. Disclosed event clustering can be detected using a packet sniffer to detect transmission time-points with respect to BLE and mesh events. One can also use a power analyzer to determine the node activity for a disclosed dual-mode BLE-Mesh device.

EXAMPLES

Disclosed embodiments are further illustrated by the following specific Examples, which should not be construed as limiting the scope or content of this Disclosure in any way.

For a disclosed dual-mode BLE-Mesh device having a 1 second connection interval using disclosed clustering of mesh events and BLE connection events a power savings of 30% resulted. This result is for FR LPN devices only. For relay devices, with either power line or very long scans the power savings will be significantly less. For a 100 ms scan interval for mesh device operation, the power savings for a relay device would be about 0.7%.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method, comprising:
   determining, by a device, a timing of a mesh data slot for mesh communication;
   adjusting, by the device, the timing of the mesh data slot relative to a time indexed Bluetooth low energy (BLE) data slot BLE communication, to produce an adjusted mesh data slot for the mesh communication;
   communicating, by the device, during the adjusted mesh data slot; and
   communicating, by the device, during the time indexed BLE data slot.

2. The method of claim 1, wherein communicating during the time indexed BLE data slot comprises:
   receiving, by the device from a second device, a first message; and
   transmitting, by the device to the second device, a second message.

3. The method of claim 1, wherein communicating during the adjusted mesh data slot comprises transmitting, by the device, a friend low-power node ping.

4. The method of claim 1, wherein communicating during the adjusted mesh data slot comprises receiving, by the device, a mesh packet.

5. The method of claim 1, wherein adjusting the timing of the mesh data slot comprises delaying the timing of the mesh data slot.

6. The method of claim 5, wherein delaying the timing of the mesh data slot comprises delaying the timing of the mesh data slot by less than a threshold duration.

7. The method of claim 6, wherein the threshold duration is one period of a periodic set of time indexed BLE data slots that includes the time indexed BLE data slot.

8. The method of claim 1, wherein adjusting the timing of the mesh data slot comprises advancing the mesh data slot.

9. The method of claim 1, further comprising transitioning into a sleep mode from an active mode after both the adjusted mesh data slot and the time indexed BLE data slot.

10. The method of claim 1, further comprising transitioning into an active mode from a sleep mode before both the adjusted mesh data slot and the time indexed BLE data slot.

11. A device, comprising:
at least one processor; and
a non-transitory computer readable storage medium storing instructions that when executed by a processor cause the processor to:
determine a timing of a mesh data slot for mesh communication;
adjust the timing of the mesh data slot relative to a time indexed Bluetooth low energy (BLE) data slot for BLE communication, to produce an adjusted mesh data slot for mesh communication;
communicate during the adjusted mesh data slot; and
communicate during the time indexed BLE data slot.

12. The device of claim 11, wherein the instructions to communicate during the time indexed BLE data slot comprise instructions to:
receive, from a second device, a first message; and
transmit, to the second device, a second message.

13. The device of claim 11, wherein the instructions to communicate during the adjusted mesh data slot comprise instructions to transmit a friend low-power node ping.

14. The device of claim 11, wherein the instructions to communicate during the adjusted mesh data slot comprise instructions to receive a mesh packet.

15. The device of claim 11, wherein the instructions to adjust the timing of the mesh data slot comprise instructions to delay the mesh data slot.

16. The device of claim 15, wherein the instructions to delay the mesh data slot comprise instructions to delay the mesh data slot by less than a threshold duration.

17. The device of claim 11, wherein the instructions to adjust the timing of the mesh data slot comprise instructions to advance the mesh data slot.

18. The device of claim 11, wherein the device is a low-power edge node.

19. The device of claim 11, wherein the device is a low-power relay node.

20. A non-transitory computer readable storage medium storing instructions that when executed by a processor cause the processor to:
determine a timing of a mesh data slot for mesh communication;
adjust the timing of the mesh data slot relative to a time indexed Bluetooth low energy (BLE) data slot for BLE communication, to produce an adjusted mesh data slot for mesh communication;
communicate during the adjusted mesh data slot; and
communicate during the time indexed BLE data slot.

* * * * *